United States Patent
Ketharaju et al.

(10) Patent No.: US 11,508,009 B1
(45) Date of Patent: Nov. 22, 2022

(54) TRADE ASSET CARD

(71) Applicant: Wells Fargo Bank, N.A., San Francisco, CA (US)

(72) Inventors: Rameshchandra Bhaskar Ketharaju, Hyderabad (IN); Manish Pandey, Bangalore (IN); Prabal Nandi, Hyderabad (IN); Shanmukeswara Rao Donkada, Hyderabad (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 971 days.

(21) Appl. No.: 15/601,105

(22) Filed: May 22, 2017

(51) Int. Cl.
| G06Q 40/06 | (2012.01) |
| G06Q 40/04 | (2012.01) |
| G06Q 20/10 | (2012.01) |
| G06Q 30/02 | (2012.01) |

(52) U.S. Cl.
CPC .......... *G06Q 40/06* (2013.01); *G06Q 20/105* (2013.01); *G06Q 30/0216* (2013.01); *G06Q 40/04* (2013.01)

(58) Field of Classification Search
None
See application file for complete search history.

(56) References Cited

U.S. PATENT DOCUMENTS

| 2010/0268614 | A1* | 10/2010 | Pratt | ....................... G06Q 20/20 705/16 |
| 2012/0123841 | A1* | 5/2012 | Taveau | ............... G06Q 20/3224 705/14.23 |
| 2015/0242949 | A1* | 8/2015 | Phillips, IV | ........... G06Q 20/10 705/37 |

* cited by examiner

*Primary Examiner* — David P Sharvin
(74) *Attorney, Agent, or Firm* — Womble Bond Dickinson (US) LLP

(57) ABSTRACT

The innovation disclosed and claimed herein, in one aspect thereof, comprises systems, methods and computer program products that enable transactions requested by a user using a trade asset card. The innovation enables the transactions to be completed in real time or near real time per pre-determined rules and settings, or audited changes to rules and settings, while staying perpetually invested in the user's investment portfolio.

17 Claims, 10 Drawing Sheets

TRADE ASSET CARD

BACKGROUND

Investments are typically treated differently than cash and cash equivalents such as checking accounts and credit cards by both users and institutions (financial, retail, and/or otherwise). Investments are treated in a manner that makes the transition from invested to available cash difficult and time consuming. Customers may prefer to have money in investments instead of in cash.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Aspects of the methods and systems of the subject innovation relate generally to real- and near real-time transactions of tradable financial assets. Specifically, transactions are not limited to cash withdrawal, payments, and the like, and are completed while staying invested within a diversified digital portfolio. Such transactions include, but are not limited to, engaging in liquidating digital assets at a point of sale (POS) and other locations to generate digital cash for purchases or other transactions.

One advantage of aspects resides in the ability of the user to employ a single account for transactions and investments. Another advantage resides in the user achieving the benefits (e.g. potential of greater rate of return) of investment portfolio assets over cash holdings.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are to be understood from the following detailed description when read with the accompanying drawings.

DETAILED DESCRIPTION

Figure 1:
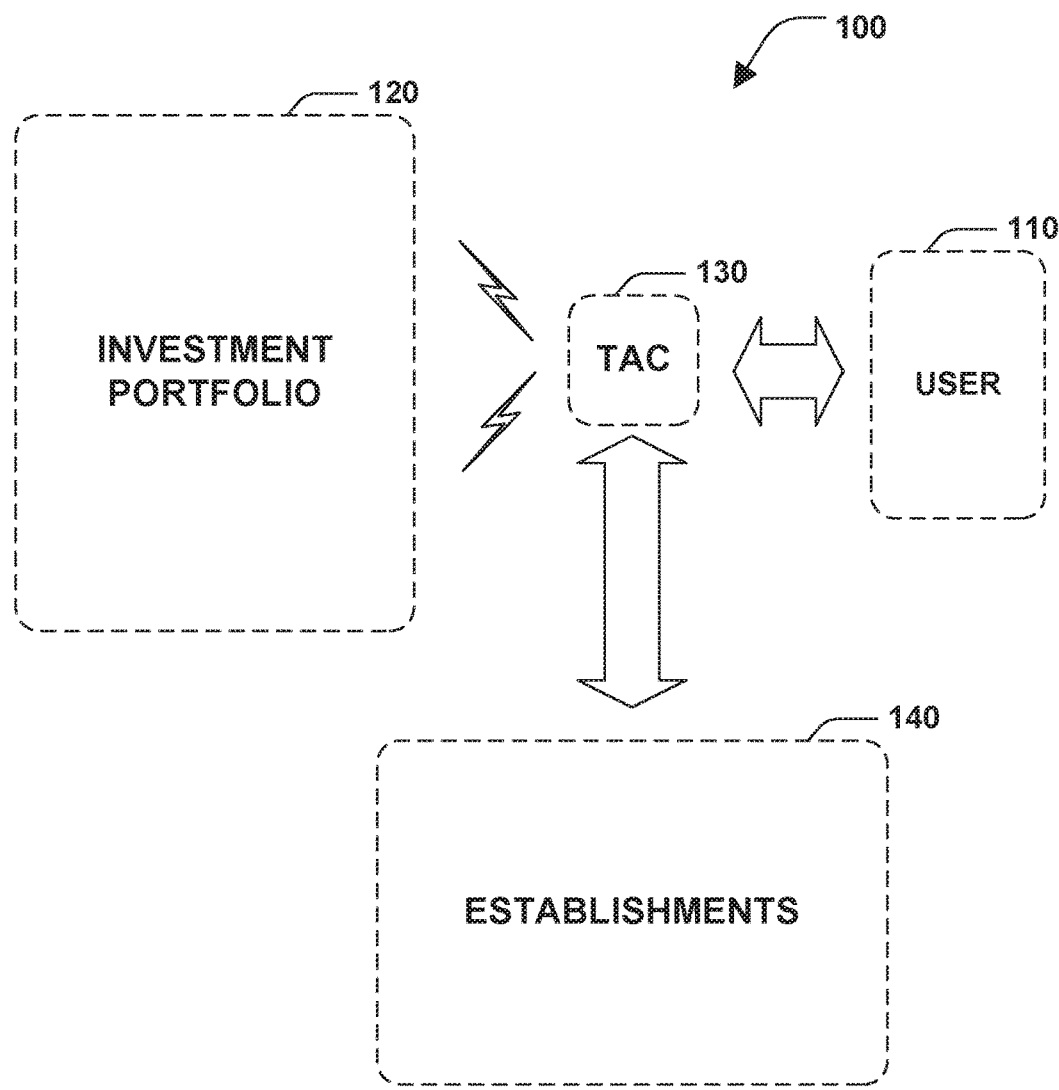
FIG. 1 illustrates a system according to aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on an Authority and the Authority can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. It is appreciated that embodiments are presented as a specific, non-limiting, examples of the innovation. Other embodiments are contemplated as well and intended to be included within the scope of this disclosure and claims appended hereto.

FIG. 1 illustrates a system 100 to facilitate purchases (e.g., payment transactions) that are funded in real-time or near real-time. FIG. 1 includes a user 110. The user 110 may have financial assets in an investment portfolio 120. The user 110 may have financial assets in the investment portfolio 120 that is used for purchases. The user 110 can use the investment portfolio 120 (or multiple investment portfolios) or a preselected portion (e.g., to a pre-specified percentage or threshold value), of the investment portfolio 120, and such use may be maintained in an invested state.

In some embodiments, the investment portfolio 120 is managed in a digital or computerized environment. In some embodiments, the investment portfolio 120 may be controlled by an establishment other than the user 110. In some embodiments, these establishments may be a bank, brokerage, or other financial institution. In other embodiments, the investment portfolio 120 is managed by a person/entity in control of the investment portfolio 120. In some embodiments, the user 110 can configure operating rules, options, and/or the like.

In some embodiments, the investment portfolio 120 may contain cash as part of the investment state. It is appreciated that the term invested (or fully invested) may be indicative of a set amount of the user's 110 assets that is less than all of a user's 110 assets or may be a full amount that user has invested in a particular grouping of investments. The investment portfolio 120 can be employed for purchases. It is appreciated that while the discussion of examples focuses mainly on a single investment portfolio 120, embodiments of multiple portfolios are contemplated herein.

The investment portfolio 120 may be associated (e.g., linked) with a trade asset card (TAC) 130. The TAC 130 may be used to pay for goods, services, and/or the like. The TAC 130 can be used at establishments 140 that sell the goods and services. The TAC 130 may be associated with the investment portfolio 120. The TAC 130 includes account information associated with the user 110, the investment portfolio 120, financial institution, and/or the like. The TAC 130 can provide the information to the establishment 140.

In some embodiments, the TAC 130 may be a physical card equipped with a readable medium, e.g., magnetic strip, barcode, Radio Frequency Identification (RFID) and/or the like. In other embodiments, the TAC 130 may be an electronic wallet card.

In some embodiments, the establishments 140 are online retailers or other electronic commerce entities. The TAC 130 may interact with electronic commerce entities associated with establishments 140 for goods and services. The interactions may be completed using the investment portfolio 120 through the TAC 130.

In some embodiments, the establishments 140 can employ a card payment processing system. The card payment processing system can contact financial entities or the like to complete purchases, approve/deny purchases, and/or check card balances or the like, much like conventional credit (or debit) card processing systems. The TAC 130 can be provided by the user 110 to the establishment 140 at the time of purchase. The TAC 130 can be read at the establishment 140 for the account information.

The establishment 140 can contact the financial entity (e.g. financial institution or brokerage) that manages the investment portfolio 120 to provide purchase information. The purchase information can include amount, date/time, item, and/or the like. Investment assets of the investment portfolio 120 can be sold equal to or near equal to the purchase amount. Investment assets of the investment portfolio 120 can be settled into a cash amount equivalent to the purchase amount. The financial institution can transfer the cash amount to the establishment 140 as payment for the goods and services. In other embodiments, the TAC 130 may be used at an automated teller machine (ATM) to retrieve physical cash, where assets in the investment portfolio 120 are liquidated to finance the transfer of the physical cash to the user.

It is appreciated that the financial institution and/or the investment portfolio can employ systems and algorithms to automatically determine the investment assets used to complete a purchase and transfer payment to the establishment. Such systems are described in detail herein.

Figure 2:
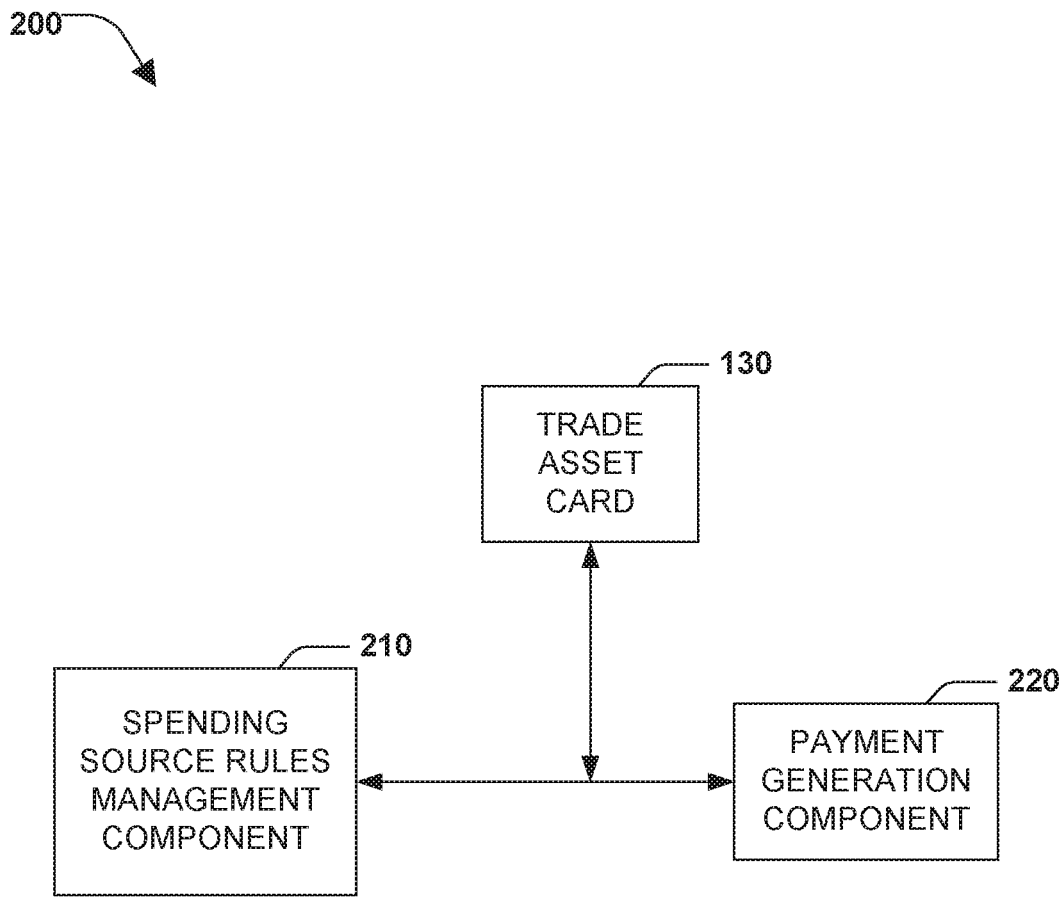
FIG. 2 illustrates a system architecture in accordance with aspects of the innovation.

FIG. 2 illustrates an example system architecture 200 that can facilitate the systems and use of a TAC 130 as described above. While for simplicity sake, the innovation is discussed herein as a physical card (and associated systems and methods), it is appreciated that other embodiments of the innovation are contemplated, such as digital cards, chip cards, a digital wallet, and/or the like, and can be employed in alternate embodiments.

The system architecture 200 may include a spending source rules (SSR) management component 210 and payment generation component 220. The SSR management component 210 creates, manages, and executes spending source rules. The SSRs determine how the investment portfolio 120 settles investment assets to complete purchases by the TAC 130. The payment generation component 230 facilitates selling and/or trading of assets to finance purchases requested by the TAC 130.

Figure 3:
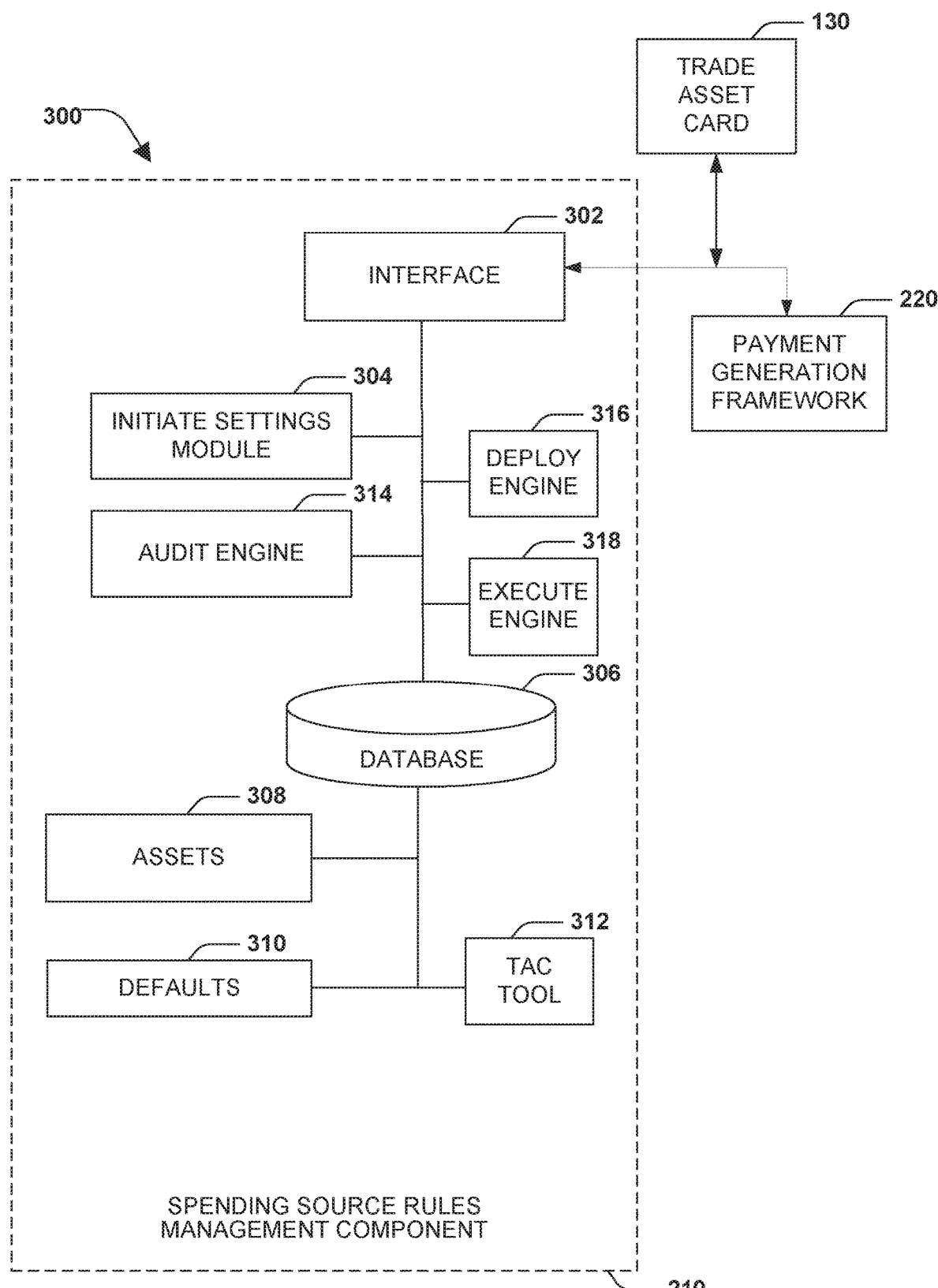
FIG. 3 illustrates a component diagram of a spending source rules management component in accordance with aspects of the innovation.

FIG. 3 illustrates an embodiment of the SSR management component 210. The SSR management component 210 includes an interface module 302 that can be communicatively connected to TAC 130 and to the payment generation component 220. The SSR management component 210 includes an initiate settings module 304 and a database 306. The initiate settings module 304 may populate the database 306 with digital values associated with a plurality of assets 308. In some embodiments, the assets 308 may be in digitized form in the investment portfolio 120 or a financial institution and may be at least a valuation of assets and converted digital assets. The assets 308 may reflect the value of the investment portfolio 120 that includes stocks/bonds, fixed income, other securities, and/or the like. It is appreciated that digitization can be completed such that the value of the user's 110 assets can include traditional and non-traditional financial assets. The assets 308 can include but are not limited to the following and their digitized value equivalents: cash, securities, equities, mutual funds, bonds, futures, options, other derivatives, trusts, real estate, and/or the like. The investment portfolio 120 may include a balance of digital cash, and/or combination thereof of cash and non-cash assets.

The database 306 can include default rules and settings (defaults) 310. The defaults 310 can be rules and settings between the user 110 and the financial institution regarding the TAC 130 and the investment portfolio 120. The defaults 310 can be formed at the time of a registration of a TAC 130 or can be established post-registration. For example, defaults may be provided in terms and agreements agreed to at a registration or modified during the life of a contract controlling the use of the TAC 130 and the investment portfolio 120. The defaults 310 include an initial set of SSR's. The set of SSR's dictate at least in part the investment portfolio value and can be a function of various risk and investment factors agreed to at least in part by the user 110.

In some embodiments, the defaults 310 may be employed in an electronic environment. For example, the defaults 310 may be deployed in an ASICS or software that may execute the captured protocol of the SSR. Embodiments of SSRs may use various formats. For example, the SSRs may be deployed using JSON to represent the condition and modalities regarding liquidation of digital assets to complete purchases may be ordered, prioritized and controlled.

In some embodiments, code for deployed SSRs is implemented. It is appreciated that other code language embodiments or other labels and/or naming conventions are contemplated. In an example, SSRs may be labeled "Magenta," "Conservative," "LoThousands," and ""Growth-Modified." It is to be appreciated that other spending source rules may be initially established, created, modified, stored, shared, and/or employed.

In the example, an SSR labeled MAGENTA may be implemented as:

```
Magenta: If (Payment < 800) and (market = = "open"))
then get 100% from LND.Cash else get 100% from
CardAcc.34345
{
  "name": "Magenta",
  "rule":[
    {
      "amount":{
        "max": 800
      },
      "primary":{
        "condition":{
          "market": "open"
        },
        "action": {
          "get":100,
          "use":"LND.Cash"
        }
      },
      "rest": {
        "use":"CardAcc.34345"
      }
    }
  ]
}
```

The Magenta example may be alternatively implemented in XML as:

```
<?xml version="1.0" encoding="UTF-8" ?>
  <name>Magenta</name>
  <rule>
    <amount>
      <max>800</max>
    </amount>
    <primary>
      <condition>
        <market>open</market>
      </condition>
      <action>
        <get>100</get>
        <use>LND.Cash</use>
      </action>
    </primary>
    <rest>
      <use>CardAcc.34345</use>
    </rest>
  </rule>
```

The example SSR "Magenta" may be invoked when a transaction (e.g. purchase) for less than $800 during market open hours is attempted with TAC 130. The rule dictates that 100% of the $800 are obtained from the account "LND-.Cash." If the market is closed or if the account does not have the amount then digital cash may be obtained from "CardAcc.34345." "CardAcc.34345" is a line of credit or credit card account that can be accessed at any time.

Another SSR can be Conservative and implemented as:

```
Conservative: If (1000 < Payment < 2500) then use
100% from BOFA.12345
  { "name": "Conservative",
    "rule": [
      {
        "primary" : {
          "min" : "1000",
          "max":"2500",
          "share":"100",
          "use":"BOFA.12345"
        }}]}
```

Yet another SSR can be LoThousands and implemented as:

```
LoThousands: If (1000 < Payment < 4500) then
get 100% from ZBANK.12345
{
  "name":"LoThousands",
  "rule":[
    {
      "primary": {
        "min":1000,
        "max":4500,
        "get":100,
        "use":"ZBANK.12345"
      }
    }
  ]
}
```

In this example, 'ZBANK.12345" can include three Certificates of Deposit (CD). The payment generation component 220 can determine which CD is best to break and liquidate to obtain digital cash, after factoring possible early withdrawal penalties.

Yet another example SSR "Growth-Modified" may be implemented as:

```
Growth-Modified: If (4501 < Payment < 20000)
then optimize the spread to get maximum of 30%
from FTEE.Transport, and maximum of 40% each
from SYMBL.XYZ and FTEE.Tech and optionally
the rest if any from ZBANK.26890
{
  "name": "Growth-Modified",
  "rule":[
    {
      "amount": {
        "min":4501,
        "max":20000
      },
      "primary": {
        "condition": {
          "algorithm": "spread"
        },
        "action-list":[
          {
            "max":40,
            "use":"FTEE.Transport"
          },
          {
            "max":40,
            "use":"SYMBL.XYZ"
          },
          {
            "max":40,
            "use":"FTEE.Tech"
          }
        ]
      },
      "rest": {
        "use":"CardAcc.34345"
      }
    }
  ]
}
```

In some embodiments, an SSR or multiple SSRs control investment portfolio 120 to effect payment through the TAC 130. The SSRs may provide preferential rates or modified rules. The SSRs are deployed to the TAC 130.

The SSR management component 210 may deploy named SSRs to the TAC 130 associated with a particular user 110 as:

```
{
  "tool": "plastic",
```

```
"ssrs":[
  "LoThousands",
  "Growth-Modified",
  "Magenta"
]
}
```

In some embodiments, the database 306 can be configured by a TAC tool 312. The TAC tool 312 may provide an edit mode, wherein various settings in database 306 may be changed. In some embodiments, the TAC tool 312 may be a graphical user interface (GUI) that is presented to a user or a representative of the investment portfolio 120. Changes may occur at an initial registration or post-registration. The initiate settings module 304 can interface with the TAC tool 312 to control user-initiated changes and allow pre-determined permissible changes. In some embodiments, the user 110 may be provided the TAC Tool 312 to define the set of SSR's. In some embodiments, an audit engine 314 controls types of changes that may be enacted by the TAC Tool 312, and may be set at a registration. In some embodiments, the TAC Tool 312 may assist users in real (or near real) time conditions to respond to various prompts, messages, or user options as may be presented through the interface 302.

It is appreciated that the components of SSR management component 210 may interact with TAC 130 and payment generation component 220 in either a master-slave or a slave master mode, or in a combination of master-slave and slave-master modes. To effect this capability, the SSR management component 210 may include a deploy engine 316 that is associated with obtaining and/or requesting information from the TAC 130 and the payment generation component 220. The SSR management component 210 may include an execute engine 318 that can be associated with directing or controlling information exchanges with the TAC 130 and the payment generation component 220. In real time or near real time, one of the deploy engine 316 or the execute engine 318 may be invoked, and may thus control and/or obtain data and actions to and from TAC 130 and the payment generation component 220. The initiate settings 304 may read database 306, check the TAC 320 balance and the audit engine 314 may confirm or deny the transaction.

Figure 4:
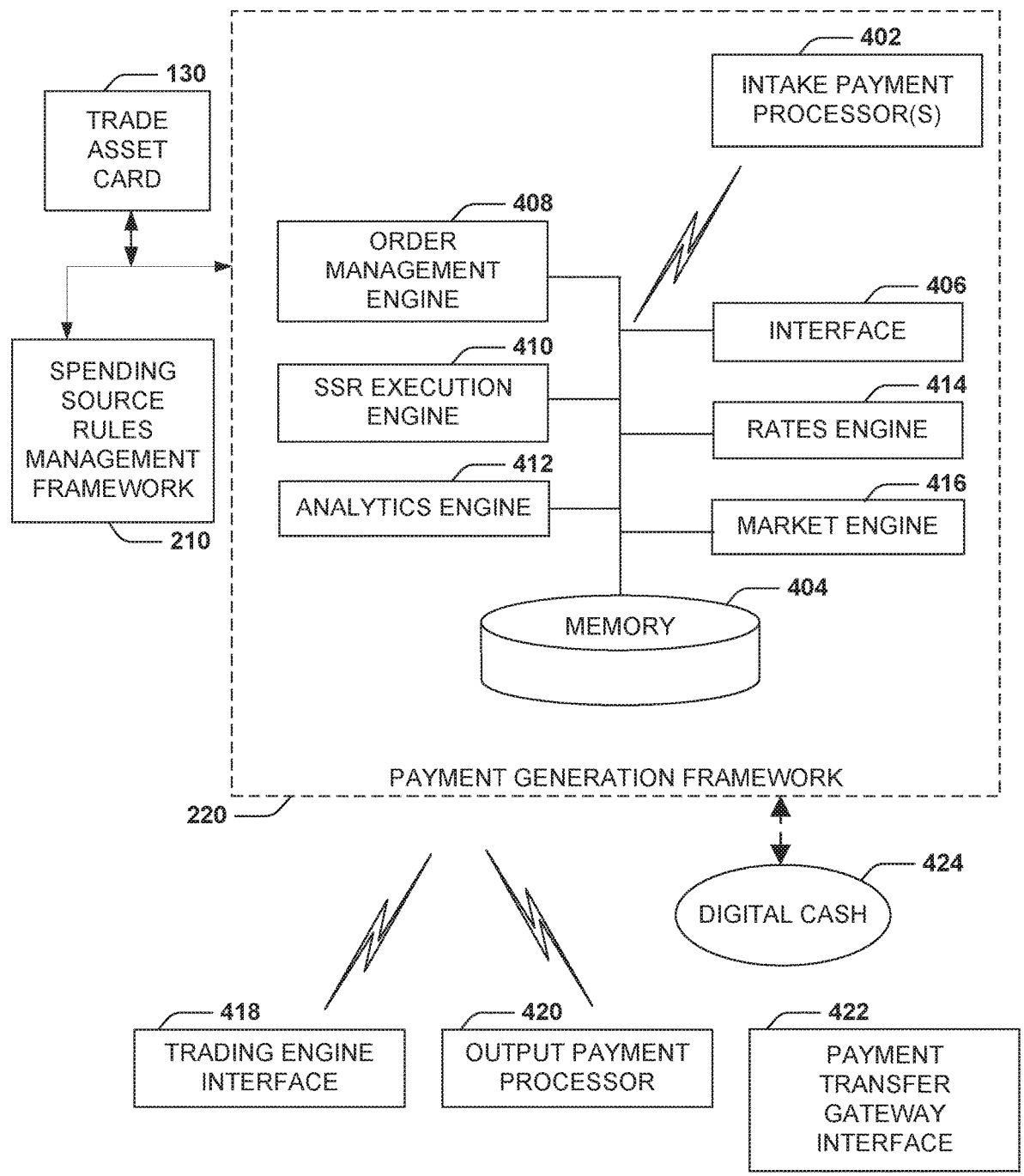
FIG. 4 illustrates a component diagram of a payment generation component in accordance with aspects of the innovation.

FIG. 4 illustrates a component diagram of the payment generation component 220. The payment generation component 220 includes an intake payment processor 402 communicatively connected with a memory 404 through an interface 406. The intake payment processor 402 may receive inputs from the SSR management component 210 through the interface 406. The intake payment processor 402 may translate the inputs.

The inputs activate an order management engine 408. The order management engine 408 can determine actions of the payment generation component 220. In some embodiments, the order management engine 408 may interact with at least the memory 404 and SSR execution engine 410. In other embodiments, the order management engine 408 may interact with an analytics engine 412, a market engine 414, and a rates engine 416 to obtain and process information to interact with the SSR management component 210.

The order management engine 408 may be communicatively connected with a trading engine interface 418, an output payment processor 420, or a payment transfer gateway interface 422 to facilitate information gathering and other interactions with financial institutions, brokerage firms, and/or the like.

The order management engine 408 can receive SSRs from the SSR management component 210. From the SSRs, the order management engine 408 determines a priority order for liquidation of investment assets in the investment portfolio 120. In some embodiments, the priority order is fixed. In other embodiments, the order management engine 408 suggests other priority orders of asset liquidation. The order management engine 408 may analyze each asset in the investment portfolio 120, and assess a range of assets to liquidate. For example, multiple equity scripts can belong to an equity asset class. The order management engine 408 may determine the order of equities to be liquidated based on captured past or predicted future performances of each asset. The order management engine 408 can integrate output of the analytics engine 412 and supply the order to the SSR management component 210.

The order management engine 408 finalizes execution of purchases. The order management engine 408 converts the investment assets in the investment portfolio 120 into digital cash 424. The digital cash 424 can be transferred to the establishment 140 (e.g. a financial account of the establishment 140) to complete a purchase.

In some embodiments, the analytics engine 412 may engage the intake payment processor 402 and the memory 404 to analyze information from the SSR management component 210. The analytics engine 412 can determine trends in user activity, market conditions, TAC 130 use, and/or the like. The analytics engine 412 can employ various artificial intelligence techniques. The trends facilitate determining new or modified SSRs. In some embodiments, the new or modified SSRs may be based on the user's 110 financial strengths to categorize the user as unbanked, underbanked or fully banked. Further embodiments of analytics engine 412 may apply artificial intelligence techniques to refine various SSRs and the impact across users. A financial institution may employ the analysis to generate customized SSRs (or improve existing default SSRs) for varying or changing user preferences or capabilities.

In some embodiments, the analytics engine 412 may calculate the performance of the assets and predict near term performance. In other embodiments, analytics engine 412 may perform value and fraud audits on attempted interactions. In some embodiments, the rates engine 414 tracks and trends rate conditions. In some embodiments, rates engine 414 may receive rates market information from third party sources.

In some embodiments, the market engine 416 may be communicatively connected to the trading engine interface 418, output payment processor 420, and/or payment transfer gateway interface 422. The market engine 416 tracks and trends market conditions. In some embodiments, the market engine 416 obtains market information from third party sources.

In some embodiments, the SSR management component 210 can direct the payment generation component 220 to update values of the investment portfolio 120. The SSR management component 210 can use the updated values to calculate an optimal mode of converting the investment portfolio 120 according to the SSRs (or new, modified, and/or approved SSRs).

Figure 5:
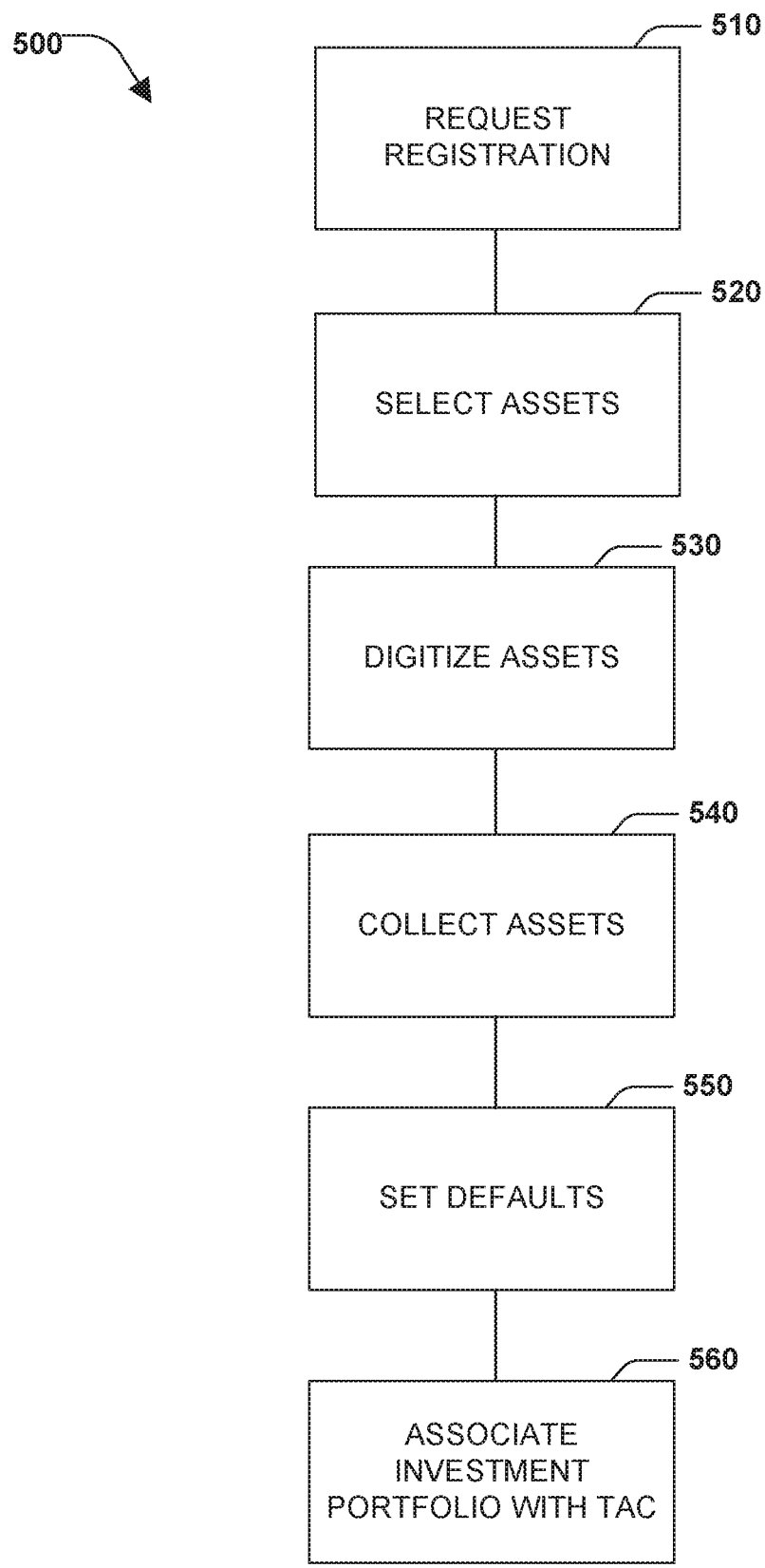
FIG. 5 illustrates a registration method in accordance with aspects of the innovation.

FIG. 5 illustrates a method 500 to register a user to use a TAC can begin at 510. The registration is triggered at 510 by a user request to obtain or use a TAC for purchases and/or the like. The request may occur in person or otherwise, and may involve a user and an investment portfolio manager. At 520, assets of the user are selected to be associated with (or used by) the TAC. The user can select an investment portfolio or investment assets to be associated with the TAC. This may occur with inputs from along with inputs from the user directly, or indirectly. The user may select assets to be digitized, with or without advice from others. These assets may include stocks/bonds, fixed income, or other miscellaneous securities. The assets reflect on the potential of that process to include both digital and non-digital assets—digital assets directly, and the agreed upon value (a digitized aspect) of non-digital assets.

At 530, the selected assets are digitized to be included in an investment portfolio that will be associated with the TAC to finance purchases. The user provided assets are digitized, which may involve creation of digital cash, or digital valuations of various assets. It is appreciated that the digitization is completed such that the value of the user's assets in digital form can include traditional and non-traditional financial assets. The types of financial assets can include but are not limited to: cash, securities, equities, mutual funds, bonds, futures, options, other derivatives, trusts, real estate, and/or the like. In some embodiments, the financial assets may be in digitized cash equivalents.

At 540, the digitized assets are collected in an investment portfolio that is associated with the TAC. In some embodiments, there may be a fetch function originating from the user to the various banks and brokerage firms and other entities to retrieve the assets. In other embodiments, the assets are validated for the digitized values of the digitized assets in the investment portfolio. It is appreciated that the collecting the assets 540 and digitizing the assets 530 may be performed in sequence, concurrently, or in an iterative fashion for multiple assets.

At 550, default settings and rules are determine and associated with the investment portfolio. The defaults may be determined by input of a number of rules and default settings agreed to by the user and the investment portfolio manager. The defaults will at least initially control dispersion or settlement of the assets that make up the investment portfolio.

At 560, a TAC is associated with the registered investment portfolio. The TAC may include information to direct purchases to be funded by assets in the investment portfolio. For example, the TAC may include an account number that directs a card processing system to the financial institution and the investment portfolio associated with the TAC when the TAC is read to make a purchase. The TAC may be one of a physical card optionally equipped with a readable medium, e.g., magnetic strip, barcode, RFID, or the like, or may be one of an electronic wallet card.

Figure 6:
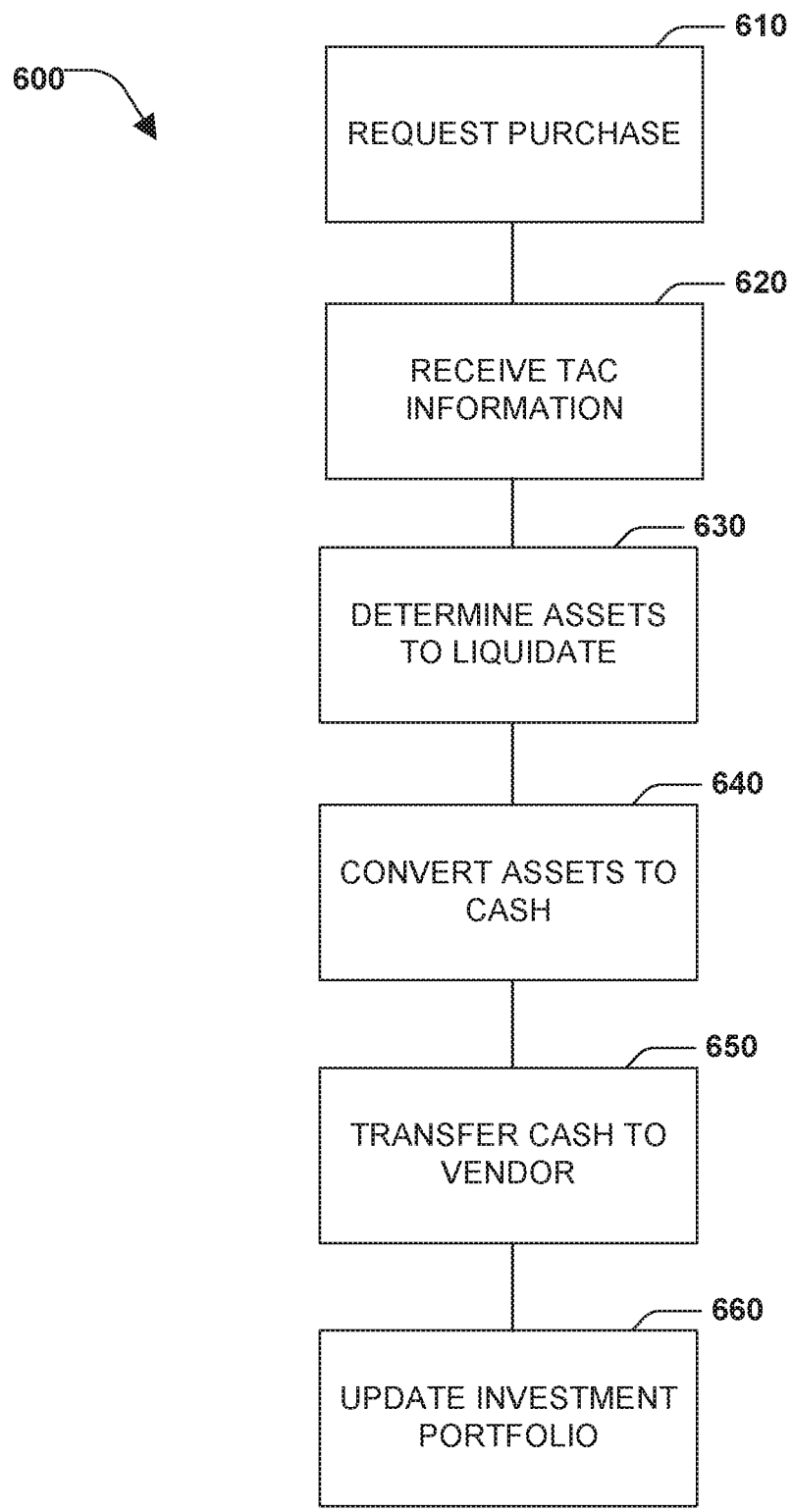
FIG. 6 illustrates a method for liquidating assets of a digital portfolio for purchases according to aspects of the innovation.

FIG. 6 illustrates an example method 600 of using a TAC to complete a purchase. The purchase can be on of goods or services or both. The purchase may be a transfer of money from the user to an institution, private person, and/or the like. At 610, a request to complete a purchase is received. The request to complete a purchase may be received from a store or merchandiser. At 620, information about the TAC is received. The information can be account number, card number, user's name, and/or other identifying information and/or the like.

At 630, assets in an investment portfolio that is associated with the TAC are determined. The assets can be determined using the SSRs that are associated for the investment portfolio and/or TAC account. For example, a priority SSR can determine an order for assets to be sold. For example, the priority SSR may dictate that Stock A should be sold before Stock B to complete a purchase.

At 640, the determined assets are converted to cash. In some embodiments, the assets may be sold on a trading market as a real time (or near real time) trade. In some embodiments, the financial institution creates a placeholder for the asset values to settle the purchase and then completes the asset sale on the trading market at a later time. At 650, cash from the converted assets are transferred to the vendor. For example, the cash is digital cash that can be wire transferred the account of the vendor.

When the transfer is complete, the purchase is completed for the user. At 660, the investment portfolio associated with the TAC is updated. It is appreciated that the investment portfolio can be updated prior to, concurrently, or in near real time to the other steps of method 600.

It is appreciated that the method 600 is an example method of one basic transaction. Other embodiments and functionality are contemplated herein. In some embodiments, the method 600 includes determining latest stock prices from external exchanges, calculating pertinent fees, and determining the most cost effective mix of asset liquidation per SSRs. In some embodiments, the user may be able to edit and update SSRs during a transaction.

In some embodiments, the user may be notified of a transaction involving an investment asset. The notification can be effected using a user device (e.g. a mobile phone, tablet, computer, and/or the like). The notification can be communicated via email, text, push notification, and/or the like. The user may be presented the option to approve or deny the transaction before the asset is liquidated for the purchase.

In some embodiments, the settlement of payment between a vendor and the investment portfolio may happen instantaneously in real (or near-real) time or a final settlement may also conclude with a time lag based on the business rules. It is appreciated that such a time lag may not noticeable to the user, and the user in effect still enjoys the immediate obtainment of the merchandise.

It is appreciated that the value of the investment portfolio is dynamic in nature. The available value to be used by the TAC is dependent on the market value of the assets in the investment portfolio at a point of time that a purchase or transaction is attempted.

In other embodiments, the user may be provided more than one time option of liquidating assets. For example, assets can be liquidated at a current market value with the transaction approval process that includes limits calculation based on the current value plus any pertinent fees and transaction charges. The payments and settlements may happen in real time using block chain implementation. Alternatively, the user may be presented an option of liquidating at a future market value, in that the transaction approval process may include a limits calculation based on a percentage of current value plus pertinent fees and/or transaction charges. The percentage of current value may be based on a SSR defined at that point in time or predetermined.

In some embodiments, a purchase request may be attempted while markets are closed, and therefore asset trading is closed. In this embodiment, the purchase request may be fulfilled using digital cash when there is enough cash to settle the purchase request. The purchase request may also be fulfilled by the financial institution paying the purchase amount for the user and then completing a trade of the tradeable asset at the market close price (or market open price) when the market is opened to be paid back. In this embodiment, the financial institution may act as an underwriter for the digital value of the assets under consideration for the transaction. Block chain implementation may occur with a smart contract established between the user and the financial institution. Such efforts may be for limited periods of time or may be open ended in time. In some embodiments, the financial institution may approve of transactions in real time. In other embodiments, the approval of the financial institution is captured ahead of the transaction and contained in the system.

For example, a purchase request calls for the liquidation of an asset in the investment portfolio that reflects a current asset value of a certain amount. SSRs determine the type of asset to be liquidated which is a percentage of eligibility of the total assets of that type of asset. The SSRs can determine a premium transaction charge for a future-value based transaction, which yields a net eligible limit. The SSR execution engine would execute the transaction, if the transaction passes the SSRs (e.g. the certain amount of the liquidated asset net fees, or net eligible limit covers the proposed transaction amount). If the SSRs block the transaction, the user is informed the denial and the details. The user may be presented with an alternative liquidation option.

In another example, the settlement process may liquidate an asset at a user defined price. The asset may reach or may not reach the user defined price. In this example, the asset may sell to a quantity to obtain the digital cash for the purchase. In some embodiments, the asset may be processed during live times of the market of the asset. In some embodiments, a purchase may occur during times the market is not accessible. The liquidation may happen on real time at a point of sale (POS) or ATM or an e-commerce site. In some embodiments, the asset may become owned by the financial institution acting as an underwriter. The financial institution may offer a future contract to mutual fund firms or equivalent that may be interested in obtaining a contract option for the value at the time of a future liquidation.

It is appreciated that the financial institution may charge transaction fees for trades, use of the TAC, and/or the like. The fees may be factor into the calculation and approving a purchase request.

In some embodiments, the assets to be traded are confirmed by the user. The user may have the option of continuing the transaction, choosing a different asset to be liquidated (thereby overriding and at least temporarily modifying pertinent SSRs), or canceling the transaction.

Figure 7:
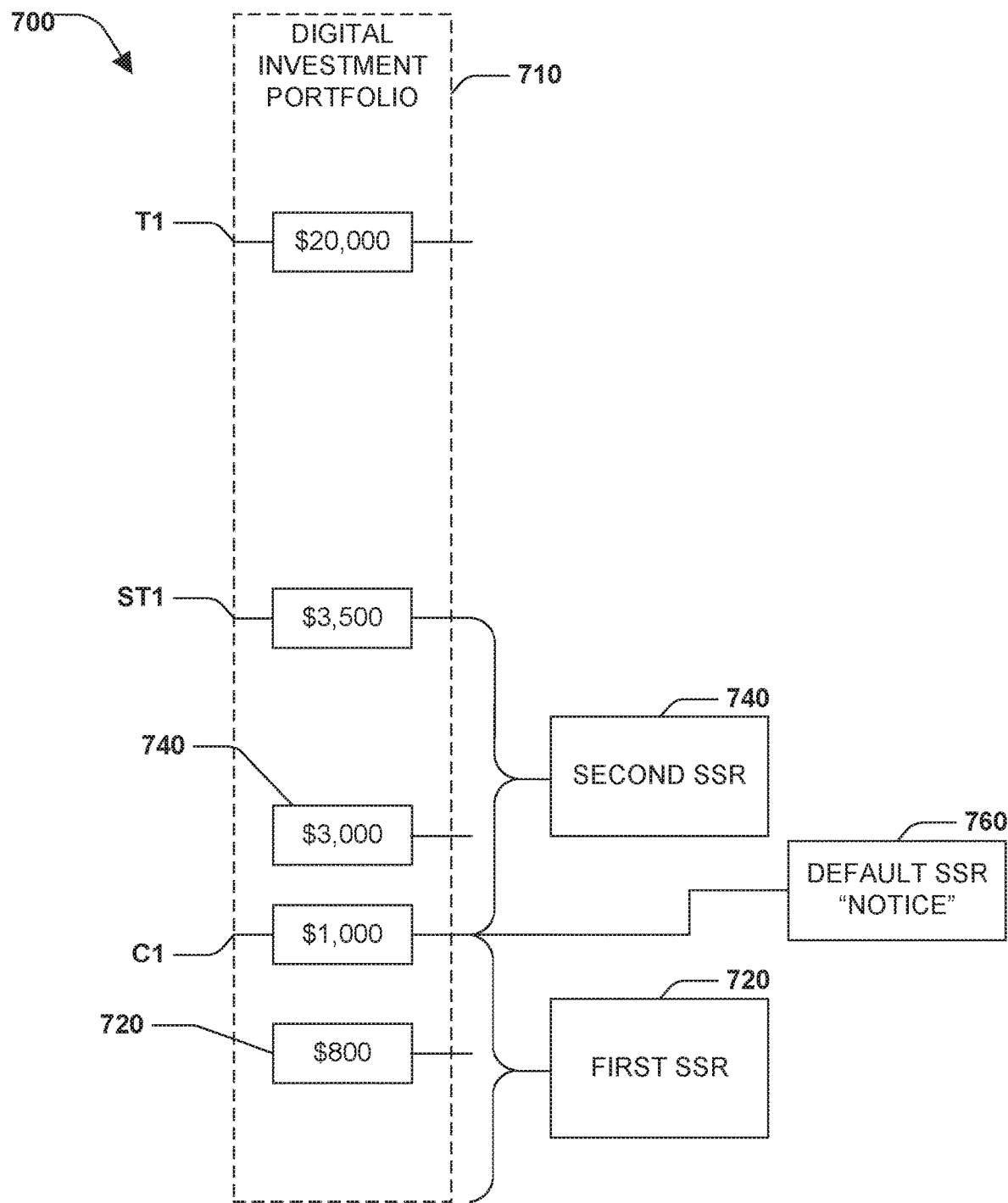
FIG. 7 illustrates default spending source rules according to some embodiments.

FIG. 7 illustrates an example of default SSRs and modified SSRs that determine how the SSRs are applied to asset liquidations for purchases. In this example, an investment portfolio 710 has a value of $20,000 ("T1"). Of the $20,000 value, digital cash may be $1,000 ("C1"), digital value of bonds and stocks may be $3,500 ("ST1"). Other investment assets are included the remaining $15,500.

The investment portfolio 710 receives a first purchase request 720 of $800. In one example, the amount is within a predetermined portfolio range for cash and a first SSR 730 may dictate that digital cash is liquidated first. In some embodiments, the first SSR 730 can require a minimum of $100 of digital cash to be maintained in the investment portfolio 710. The SSRs may indicate stocks and bonds as a second liquidation priority after digital cash. In this example, the first purchase request 720 of $800 can be completed using only digital cash as it is not greater than the digital cash less the minimum balance (e.g., $1000-$100=$900>$800). In such an instance, the transaction may occur as if a TAC was a debit card.

In another example embodiment, the investment portfolio 710 receives a second purchase request 740 of $3,000. In this example, the second purchase request 740 is greater than the available digital cash. A second SSR 750 in operation with the first SSR 730 determines a combination of cash C1 and stocks ST1 to settle the second purchase request 740. In this example, the second purchase request 740 of $3000 can be completed using the first priority digital cash as it is greater than the digital cash less the minimum balance (e.g. $1000-$100=$900<3000). Therefore, $900 of digital cash is used for the purchase, e.g. $3000-$900=$2100 remainder. The second SSR 750 determines that stocks and bonds ST1 are liquidated (e.g. converted to cash) to transfer the remaining $2100 to the vendor. In some embodiments, an SSR may dictate that if a purchase amount is greater than digital cash holdings, the entire purchase request is fulfilled by the next highest priority asset having sufficient value to satisfy the purchase request. For example, the SSR will not use the digital cash and liquidate $3000 of stocks ST1 to transfer to the vendor to complete the purchase.

In some embodiments, a notice 760 may be provided to the user that assets other than digital cash from the investment portfolio may be liquidated to generate sufficient digital cash. The user may accept or deny the liquidation of investment assets in the portfolio. In some embodiments, a notice 760 may be generated for other occurrences regarding SSRs, the investment portfolio 710, or the transaction. For example, if a purchase request of $22,000 is received; a notice may be generated and sent to the user to warn of insufficient funds.

Figure 8:
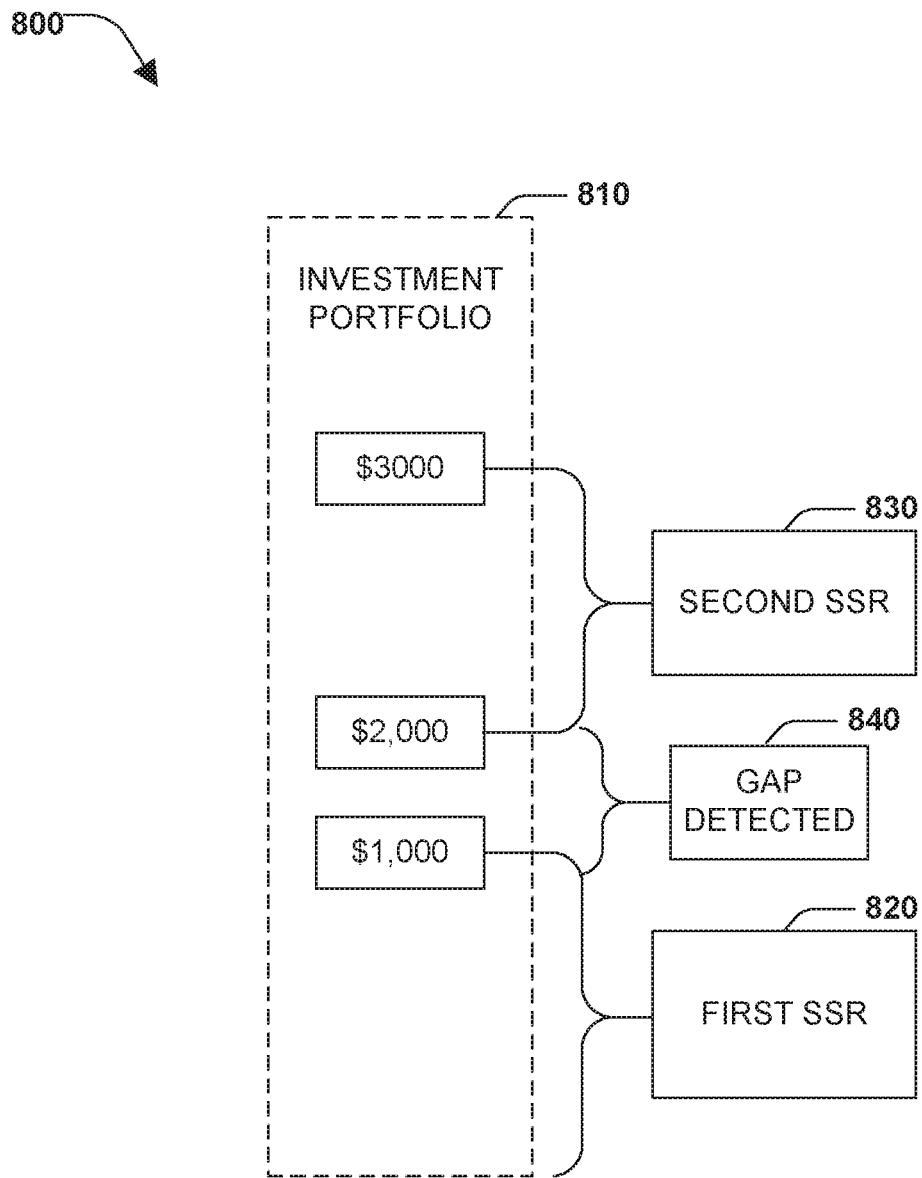
FIG. 8 illustrates a spending source rule notification according to some embodiments.

In another example, the user can modify the SSRs for different bands of purchase amounts. The SSRs can dictate different rules for different bands of purchase amounts. However, the SSRs may be modified and subsequently include a gap that is not dictated by an SSR. FIG. 8 illustrates an example of modified SSRs that that include a gap. In the example, an investment portfolio 810 includes a first modified SSR 820. The first modified SSR 820 provides a rule for purchases between $0 and $1000. The investment portfolio 810 includes a second modified SSR 830 that provides a rule for purchases between $2000 and $3000. A gap 840 is detected for purchases between $1000 and $2000. There are various actions that can occur when a gap 840 is detected. For example, a notice can be generated and sent to the user to notify the user of a gap 840. The user may then create a new SSR or modify an existing SSR to remove the gap 840.

Other actions regarding the gap 840 are contemplated. For example, upon modification of SSRs that creates a gap; an error may be generated to cancel the modification. In other embodiments, a system may modify adjacent SSRs, create a new SSR. The system may keep the gap, but not permit purchases in the gap range.

Figure 9:
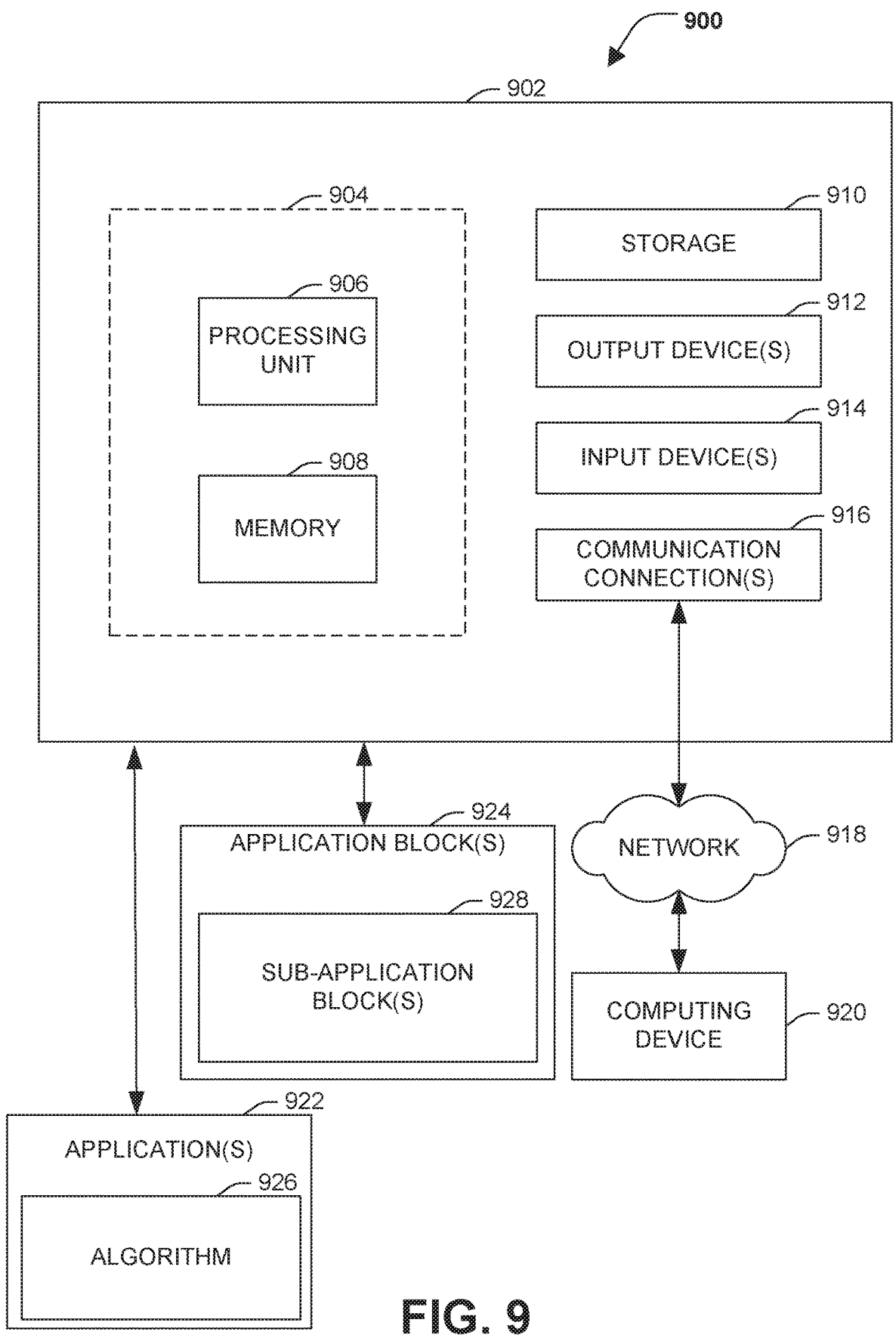
FIG. 9 illustrates a computing environment where one or more of the provisions set forth herein can be implemented, according to some embodiments.

With reference to FIG. 9, the following discussion provides a description of a suitable operating environment 900 in which embodiments of one or more of the provisions set forth herein can be implemented. The operating environment 900 of FIG. 9 is only one example of a suitable operating environment and is not intended to suggest any limitation as to the scope of use or functionality of the operating environment 900. In accordance with aspects, example computing devices 902 include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

The operating environment or system 900 can further include a network component 916. The network component 916 can facilitate connection to a mobile network, wired LAN, wireless LAN, an internet network, or the like to transmit communications. The network component 916 connects to a transmission server to send and receive data communications, alerts, or the like to and from the system 900. The mode of the communication can be text, SMS, email, push notification via an API interface, or the like. The network component 916 can update a remote database may be included in digital investment portfolio 120 (e.g., distributed, cloud-based, etc.) with the transfer information, receiver information, item information, and/or the like. The remote database can be accessed by third party entities such as a mobile application (described in detail below), a financial institution, and/or the like.

With reference again to FIG. 9, illustrated is a system 900 comprising a computing device 902 configured to implement one or more embodiments provided herein. In one configuration, computing device 902 can include at least one processing unit 906 and memory 908. Depending on the configuration and type of computing device, memory 908 may be volatile, such as RAM, non-volatile, such as ROM, flash memory, etc., or some combination. This configuration is illustrated in FIG. 9 by dashed line 904.

In these or other embodiments, device 902 can include additional features or functionality. For example, device 902 can also include additional storage such as removable storage or non-removable storage, including, but not limited to, magnetic storage, optical storage, and the like. Such additional storage is illustrated in FIG. 9 by storage 910. In some embodiments, computer readable instructions to implement one or more embodiments provided herein are maintained within storage 910. Storage 910 can also retain other computer readable instructions to implement an operating system, an application program, and the like. Computer readable instructions can be accessed in memory 908 for execution by processing unit 906, for example.

Generally, embodiments are described in the general context of "computer readable instructions" being executed by one or more computing devices. Computer readable instructions can be distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

The term "computer readable media" as used herein includes computer storage media. Computer storage media includes volatile and nonvolatile, non-transitory, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media can be part of device 902.

The term "computer readable media" includes communication media. Communication media typically embodies computer readable instructions or other data in a "modulated data signal" such as a carrier wave or other transport mechanism and includes information delivery media. The term "modulated data signal" includes a signal that has one or more of its characteristics set or changed in such a manner as to encode information in the signal.

Device 902 can include one or more input devices 914 such as keyboard, mouse, pen, voice input device, touch input device, infrared cameras, video input devices, or most any other input device. One or more output devices 912 such as one or more displays, speakers, printers, or most any other output device can also be included in device 902. The one or more input devices 914 and/or one or more output devices 912 can be connected to device 902 via a wired connection, wireless connection, or any combination thereof. In some embodiments, one or more input devices 914 or output devices 912 from another computing device can be used as input device(s) 914 or output device(s) 912 for computing device 902. Device 902 can also include one or more communication connections 916 that can facilitate communications with one or more other computing devices 920 by means of a communications network 918, which can be wired, wireless, or combination thereof, and can include ad hoc networks, intranets, the Internet, or substantially most any other communications network that can allow device 902 to communicate with at least one other computing device 920.

Figure 10:
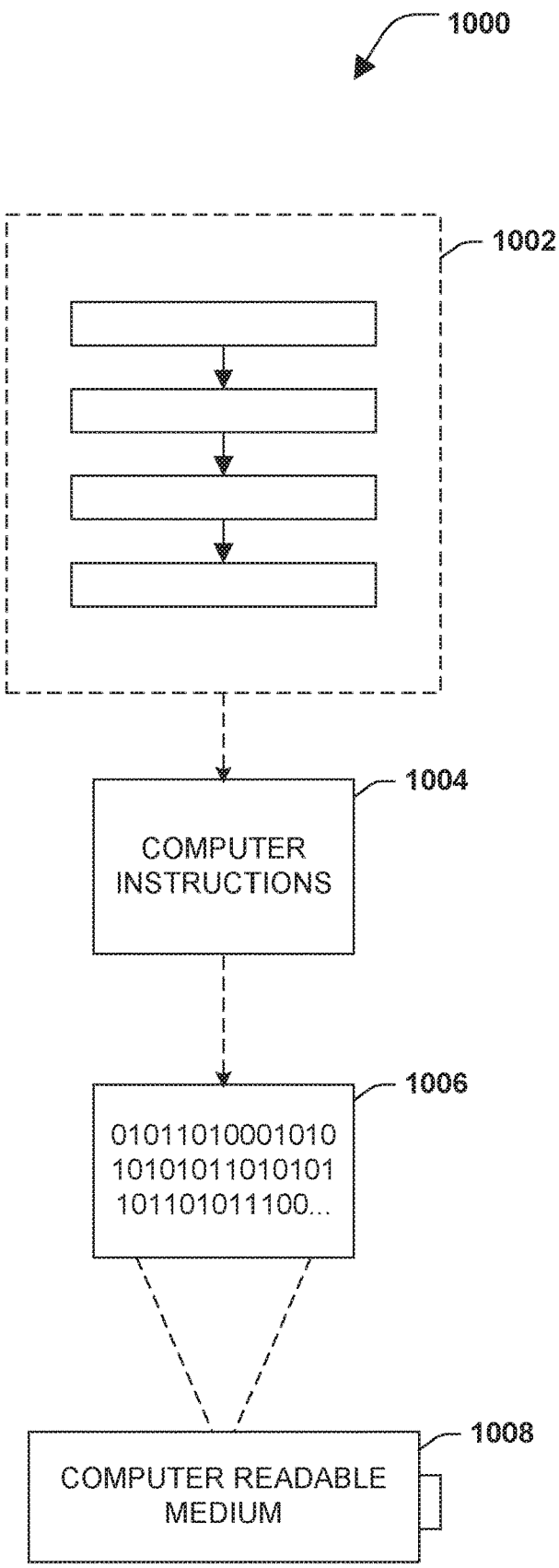
FIG. 10 illustrates a computer-readable medium or computer-readable device comprising processor-executable instructions configured to embody one or more of the provisions set forth herein, according to some embodiments.

One or more implementations include a computer-readable medium including microprocessor or processor-executable instructions configured to implement one or more embodiments presented herein. An embodiment of a computer-readable medium or a computer-readable device devised in these ways is illustrated in FIG. 10, wherein an implementation 1000 includes a computer-readable medium 1008, such as a CD-R, DVD-R, flash drive, a platter of a hard disk drive, and so forth, on which is encoded computer-readable data 1006. The computer-readable data 1006, such as binary data including a plurality of zero's and one's as illustrated, in turn includes a set of computer instructions 1004 configured to operate according to one or more of the principles set forth herein.

In the illustrated embodiment 1000, the set of computer instructions 1004 (e.g., processor-executable computer instructions) may be configured to perform the methods described above. In another embodiment, the set of computer instructions 1004 may be configured to implement the systems described above. Many such computer-readable media may be devised by those of ordinary skill in the art that are configured to operate in accordance with the techniques presented herein.

As used in this application, the terms "component," "module," "system," "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on an Authority and the Authority may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

As used herein an "entity" or "financial entity" refers to a financial institution, such as a bank, persons operating on behalf of the financial institution, and/or communication devices managed by the financial institution and/or the persons operating on behalf of the financial institution. Additionally or alternatively, the entity may be a third party monitoring source or another type of entity that has a trusted relationship with the financial institution.

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for real-time or near real-time electronic funds transfer, comprising:
a diversified digital investment portfolio including a set of tradeable assets;
a trade asset card that is associated with the diversified digital investment portfolio;
a spending source rules management component that provides spending source rules for the set of tradeable assets, wherein at least a portion of the spending source rules are applied to a plurality of purchase amount bands;
a payment generation component that converts a subset of tradeable assets in the diversified digital investment portfolio upon receiving a purchase request from the trade asset card; and
an analytics engine component that detects whether a gap exists for the plurality of purchase amount bands, wherein the gap comprises a purchase amount band not having a spending source rule applied, and in an instance in which the gap is detected, generates and sends a notification to a user device of a user associated with the diversified digital investment portfolio, wherein the subset of tradeable assets is converted according at least in part to the spending source rules of the diversified digital investment portfolio, and wherein an electronic payment from within the diversified digital investment portfolio is made in real-time or near real-time by the payment generation component.

2. The system of claim 1, wherein the trade asset card is one of a physical card or an electronic wallet card.

3. The system of claim 1, wherein upon receiving the purchase request from the trade asset card, the payment generation component:
determines a monetary purchase amount from the purchase request;
identifies the subset of the tradeable assets that fulfills the monetary purchase amount based on the spending source rules; and
liquidates the subset of tradeable assets into digital cash equaling the monetary purchase amount.

4. The system of claim 3, wherein the payment generation component comprises:
a payment transfer gateway interface that transfers the digital cash equaling the monetary purchase amount to a vendor.

5. The system of claim 1, wherein the spending source rules management component determines the subset of tradeable assets according to a monetary purchase amount that is based on the spending source rules.

6. The system of claim 1, wherein the spending source rules management component determines a priority order for the set of tradeable assets to be converted based on the spending source rules.

7. The system of claim 1, wherein the payment generation component:
generates a user notification indicating the subset of tradeable assets have been converted to cash; and
communicates the user notification to the user device.

8. A method for real-time or near real-time electronic funds transfer, comprising:
receiving a diversified digital investment portfolio including a set of tradeable assets;
associating a trade asset card with the diversified digital investment portfolio;
providing spending source rules for the set of tradeable assets, wherein at least a portion of the spending source rules are applied to a plurality of purchase amount bands;
receiving a purchase request from the trade asset card;

converting a subset of tradeable assets in the diversified digital investment portfolio upon receiving the purchase request;

detecting whether a gap exists for the plurality of purchase amount bands, wherein the gap comprises a purchase amount band not having a spending source rule applied, and in an instance in which the gap is detected, generating and sending a notification to a user device of a user associated with the diversified digital investment portfolio, wherein the subset of tradeable assets is converted according at least in part to the spending source rules of the diversified digital investment portfolio; and making an electronic payment from within the diversified digital investment portfolio in real-time or near real-time.

9. The method of claim 8, wherein the trade asset card is one of a physical card or an electronic wallet card.

10. The method of claim 8, wherein receiving the purchase request from the trade asset card comprises:

determining a monetary purchase amount from the purchase request;

identifying the subset of the tradeable assets that fulfills the monetary purchase amount based on the spending source rules; and liquidating the subset of tradeable assets into digital cash equaling the monetary purchase amount.

11. The method of claim 10, further comprising:

transferring the digital cash equaling the monetary purchase amount to a vendor.

12. The method of claim 8, comprising:

determining the subset of tradeable assets according to a monetary purchase amount that is based on the spending source rules.

13. The method of claim 8, comprising:

determining a priority order for the set of tradeable assets to be converted based on the spending source rules.

14. The method of claim 8, comprising:

generating a user notification indicating the subset of tradeable assets have been converted to cash; and communicating the user notification to the user device.

15. A non-transitory computer-readable medium having instructions for a processor to:

receive a diversified digital investment portfolio including a set of tradeable assets;

receive a purchase request from a trade asset card associated with the diversified digital investment portfolio;

provide spending source rules for the set of tradeable assets, wherein at least a portion of the spending source rules are applied to a plurality of purchase amount bands;

convert a subset of tradeable assets in the diversified digital investment portfolio upon receiving the purchase request;

detect whether a gap exists for the plurality of purchase amount bands, wherein the gap comprises a purchase amount band not having a spending source rule applied, and in an instance in which the gap is detected, generate and send a notification to a user device of a user associated with the diversified digital investment portfolio, wherein the subset of tradeable assets is converted according at least in part to the spending source rules of the diversified digital investment portfolio; and make an electronic payment from within the diversified digital investment portfolio in real-time or near real-time.

16. The non-transitory computer-readable medium of claim 15, wherein the processor is further configured to determine a priority order for the set of tradeable assets to be converted based on the spending source rules.

17. The non-transitory computer-readable medium of claim 15, wherein the processor is further configured to:

determine a monetary purchase amount from the purchase request;

identify the subset of the tradeable assets that fulfills the monetary purchase amount based on the spending source rules;

liquidate the subset of tradeable assets into digital cash equaling the monetary purchase amount; and transfer the digital cash equaling the monetary purchase amount to a vendor.

* * * * *